United States Patent
Mandayam et al.

(10) Patent No.: US 9,661,015 B2
(45) Date of Patent: May 23, 2017

(54) RANDOMIZING COUNTERMEASURES FOR FAULT ATTACKS

(71) Applicant: NXP B.V., Eindhoven (NL)

(72) Inventors: Jayanth Anandampillai Mandayam, San Diego, CA (US); Mark Buer, Payson, AZ (US)

(73) Assignee: NXP B.V., Eindhoven (NL)

( * ) Notice: Subject to any disclaimer, the term of this patent is extended or adjusted under 35 U.S.C. 154(b) by 13 days.

(21) Appl. No.: 14/319,329

(22) Filed: Jun. 30, 2014

(65) Prior Publication Data

US 2015/0341384 A1 Nov. 26, 2015

Related U.S. Application Data

(60) Provisional application No. 62/002,784, filed on May 23, 2014.

(51) Int. Cl.
    H04L 29/06 (2006.01)
(52) U.S. Cl.
    CPC ................................ H04L 63/1441 (2013.01)
(58) Field of Classification Search
    CPC .. H04L 29/06; H04L 63/1466; H04L 63/1441
    USPC ........................................................... 726/23
    See application file for complete search history.

(56) References Cited

U.S. PATENT DOCUMENTS

| | | | |
|---|---|---|---|
| 2008/0010557 A1* | 1/2008 | Kume | G06F 11/008 714/47.2 |
| 2012/0159187 A1* | 6/2012 | Liu | G06F 21/558 713/189 |
| 2014/0130164 A1* | 5/2014 | Cafasso | H04L 63/1408 726/23 |

* cited by examiner

*Primary Examiner* — Aubrey Wyszynski (57) ABSTRACT

A device may include countermeasure circuitry that provides a countermeasure check that protects device logic. The device may also include enforcement circuitry that non-deterministically enforces the countermeasure check on the device logic so that the device logic is not always protected by a countermeasure action within the countermeasure check. The device may non-deterministically enforce the countermeasure check according to an enforcement rate, and the device may adjust the enforcement rate depending on a priority of the device logic or device logic portion protected by a particular countermeasure check.

20 Claims, 6 Drawing Sheets

RANDOMIZING COUNTERMEASURES FOR FAULT ATTACKS

PRIORITY CLAIM

This application claims priority to provisional application Ser. No. 62/002,784, filed May 23, 2014, which is entirely incorporated by reference.

TECHNICAL FIELD

This disclosure relates to device security and also to non-deterministic enforcement of countermeasures for fault attacks.

BACKGROUND

With the rapid advance of technology in the past decades, complex electronic devices are in widespread use in virtually every context of day to day life. Electronic devices may often be quite simple, but often have hundreds or thousands of individual electronic elements that are needed to implement the device. Software frequently interfaces with the electronic components and improvements in security measures for such devices will help continue to drive the widespread adoption and demand for such devices.

DETAILED DESCRIPTION

The discussion below makes reference to fault attacks. A fault attack or fault injection may include an unauthorized change, access, or execution of a device component, resource or functionality. Accordingly, a fault attack may include errors induced into an electronic device that glitches or overrides a functionality of the device. For instance, fault attacks may vary the voltage supplied to or temperature of hardware elements of the device to facilitate unauthorized access to a memory element, to glitch a program counter value, to skip execution of a security function, to override password protection, or to otherwise compromise the security of the device. In that regard, fault attacks may facilitate unauthorized access to protected information or resources, e.g., sensitive financial data, passwords, or personal identification numbers (PINs).

The techniques, systems, devices, and circuitry discussed below may provide increased protection against fault attacks through non-deterministic enforcement of fault attack countermeasures, e.g., by randomizing countermeasure enforcement patterns. The techniques provide variability and randomization in the enforcement of fault attack countermeasures within a single device, and additionally among different devices. In that regard, the techniques may provide for unique fault attack countermeasure enforcement patterns between devices that protect against "break-one break-all" attacks and increase the difficulty for an attacker to replicate an attack on a protected application or device. In addition to increased security, the techniques, systems, devices, and circuitry discussed below may improve device performance by reducing the processing time, resources, and power spent on enforcement of fault attack countermeasures.

Figure 1:
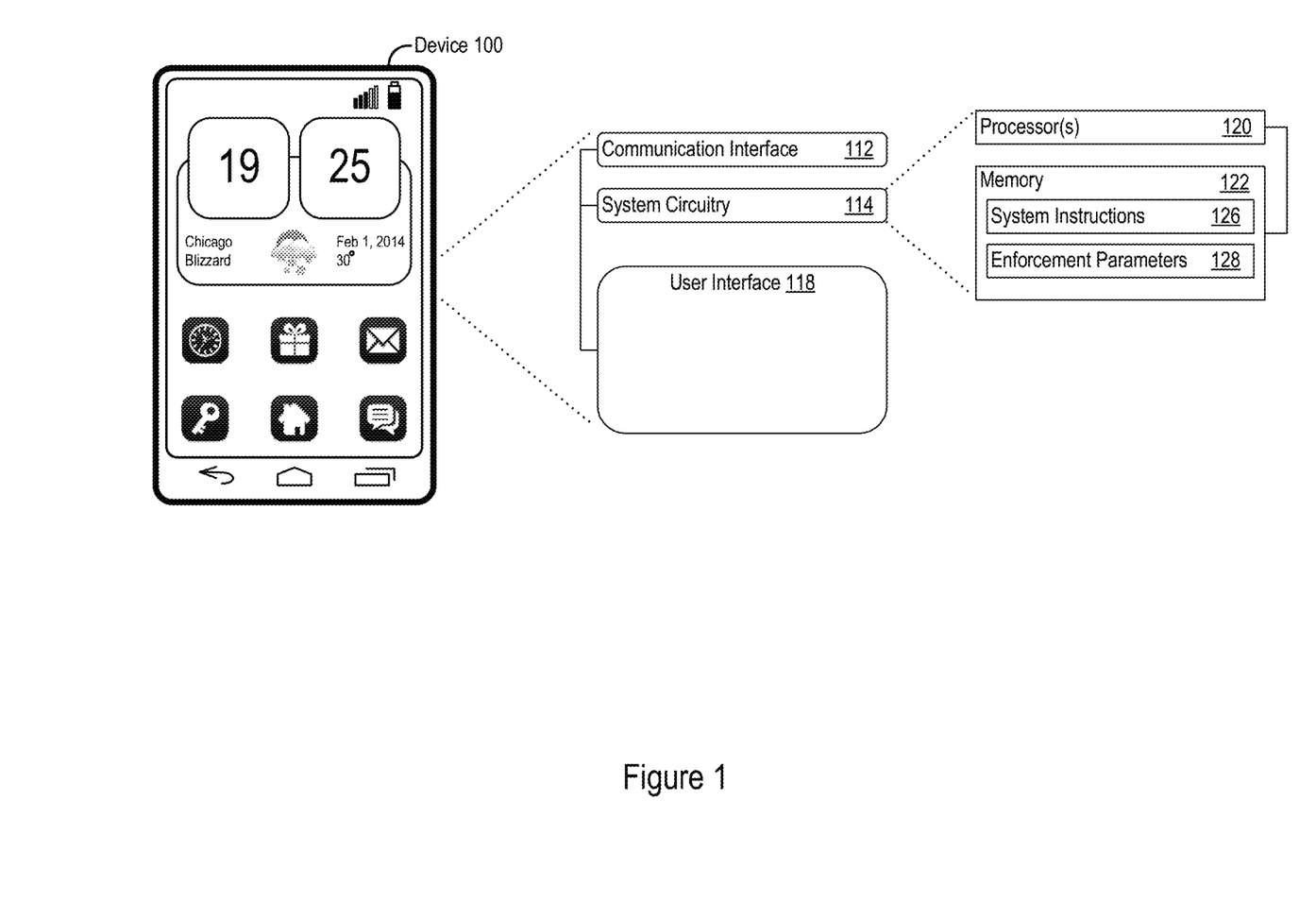
FIG. 1 shows an example of a device that non-deterministically enforces countermeasures for fault attacks.

FIG. 1 shows an example of a device 100 that non-deterministically enforces countermeasures for fault attacks. The exemplary device 100 shown in FIG. 1 is a mobile telephone, but the device 100 may take any form. As examples, the device 100 may instead be a laptop computer, desktop computer, or other type of computer, a personal data assistant, tablet device, gaming system, or a portable email device. Additional examples of the device 100 include televisions, stereo equipment such as amplifiers, pre-amplifiers, and tuners, home media devices such as compact disc (CD)/digital versatile disc (DVD) players, portable MP3 players, high definition (e.g., Blu-Ray™ or DVD audio) media players, or home media servers. Other examples of devices 100 include vehicles such as cars and planes, societal infrastructure such as power plants, traffic monitoring and control systems, or radio and television broadcasting systems. Further examples include home climate control systems, washing machines, refrigerators and freezers, dishwashers, intrusion alarms, audio/video surveillance or security equipment, network attached storage, and network routers and gateways. The devices may be found in virtually any context, including the home, business, public spaces, or automobile. Thus, as additional examples, the devices may further include automobile engine controllers, audio head ends, satellite music transceivers, noise cancellation systems, voice recognition systems, climate control systems, navigation systems, alarm systems, or other devices.

The device 100 may include a communication interface 112, which may support communication across any number of wired or wireless networks, technologies, protocols, standards, or topologies. The device 100 may also include system circuitry 114 and a user interface 118. The system circuitry 114 is part of the implementation of any desired functionality in the device 100. As discussed in greater detail below, the system circuitry 114 may support non-deterministic enforcement of countermeasures for fault attacks. In some implementations, the system circuitry 114 includes one or more processors 120 and memories 122. The memory 122 stores, for example, system instructions 126 that the processor 120 may execute to non-deterministically enforce a countermeasure for a fault attack. The memory 122 may also store enforcement parameters 128 specifying how the system circuitry 114 non-deterministically enforces the countermeasure (e.g., an enforcement frequency or density, non-deterministic enforcement configurations, or enforcement transition criteria).

Figure 2:
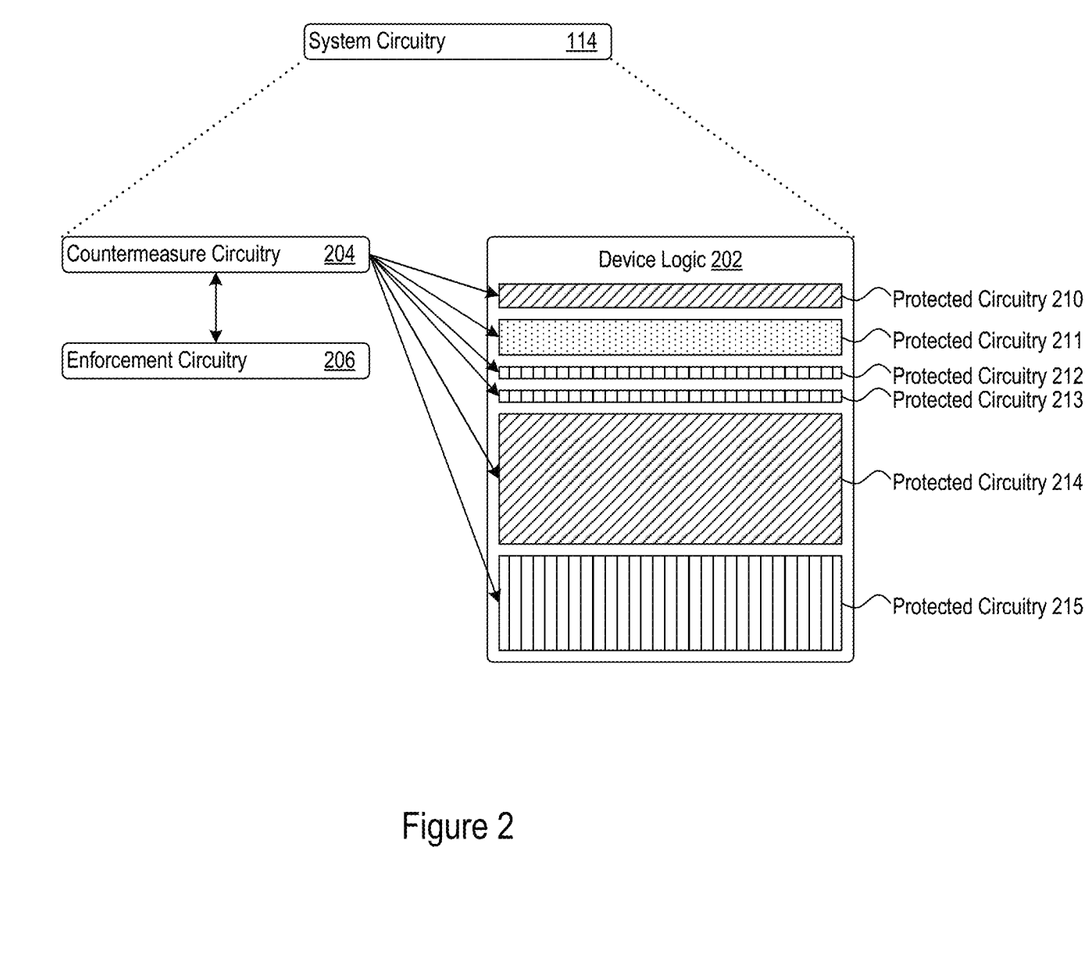
FIG. 2 shows an exemplary implementation of system circuitry for non-deterministically enforcing countermeasures for fault attacks.

FIG. 2 shows an example implementation of system circuitry 114 for non-deterministically enforcing countermeasures for fault attacks that the device 100 may implement. The system circuitry 114 shown in FIG. 2 includes device logic 202, countermeasure circuitry 204, and enforcement circuitry 206. The device logic 202 may be any hardware, software, or hardware-software combination implemented in the device 100 with any range of functionality or purpose. The number of forms the device logic 202 may take is nearly limitless, and examples include any executable application, software module, individual instructions, a processor core, a register file, any random access memory, table, or other memory, logic gates, execution pipelines, or other forms. As particular examples, the device logic 202 may take the form of a financial mobile application executing on a mobile telephone or of dedicated sensor circuitry of an actuator in an industrial factory.

The system circuitry 114 shown in FIG. 2 includes countermeasure circuitry 204. The countermeasure circuitry 204 may implement or provide one or more countermeasure checks that protect the device logic 202. A countermeasure check provided by the countermeasure circuitry 204 may detect whether a fault injection is occurring or has occurred when processing, executing, or accessing a particular portion of the device logic 202. Exemplary countermeasure checks that the countermeasure circuitry 204 may implement include verifying that a checkvalue variable or register value has an expected value after execution of a particular portion of the device logic 202, that one or more loop counter values indicating a loop has been executed an expected number of times, that a particular memory element or hardware element was accessed an expected number of times, and that no unauthorized memory write operations were performed by the device 100.

The countermeasure check provided by the countermeasure circuitry 204 may include a countermeasure action. A countermeasure action may refer to a response action that the countermeasure circuitry 204 may take upon detecting a fault injection. For example, when the countermeasure check indicates a fault injection has occurred, the countermeasure circuitry 204 may jump to a fault response portion of a software program, initiate dedicated security circuitry to handle the fault injection, or take another action. Thus, the countermeasure circuitry 204 may conditionally apply the countermeasure action dependent upon whether the countermeasure check detects a fault injection or not.

The countermeasure circuitry 204 may apply multiple countermeasure checks for the device logic 202. To use the device logic 202 in FIG. 2 as an illustration, the countermeasure circuitry 204 may implement or provide a countermeasure check for any of the shaded regions of the device logic 202, including the protected circuitry 210-215. The protected circuitry 210-215 may respectively correspond to a particular software function, module, hardware element, circuitry, or other delineation of the device logic 202. As one illustration, the countermeasure circuitry 204 may provide countermeasure A to protect the protected circuitry 210 of the device logic 202 and countermeasure B to protect the protected circuitry 215. In some variations, the different portions of the device logic 202 (such as protected circuitries 210-215) may be characterized by differing function criticality, security requirements, or priority. In that regard, the protected circuitry 210 of the device logic 202 may be characterized by a first priority and the protected circuitry 215 of the device logic 202 may be characterized by a second priority that may be higher, the same as, or lower than that of portion A.

The system circuitry 114 may include enforcement circuitry 206. The enforcement circuitry 206 may non-deterministically enforce a particular countermeasure check that protects the device logic 202. In doing so, the enforcement circuitry 206 may enforce the particular countermeasure check such that the device logic 202 is not always protected by a countermeasure action within the particular countermeasure check. Some example illustrations of non-deterministic enforcement of countermeasures are presented next.

The enforcement circuitry 206 may non-deterministically enforce countermeasure A that protects portion A of the device logic 202. In some variations, the enforcement circuitry 206 randomly enforces countermeasures A, e.g., by determining randomly whether or not to enforce countermeasure A upon an access or execution of portion A. Additionally or alternatively, the enforcement circuitry 206 may non-deterministically enforce countermeasure A according to an enforcement threshold parameter, which may specify an enforcement density, rate, percentage, or probability for enforcing a particular countermeasure or a set of countermeasures.

In determining whether to enforce a countermeasure during a particular access, run, or execution of the device logic 202, the enforcement circuitry 206 may apply a determination function, e.g., through generating a random number and applying the random number as a function of the enforcement threshold. For instance, the enforcement circuitry 206 may generate a random number ranging between 1 to 100 upon identifying access to a first portion of the device logic 202, such as the protected circuitry 210. The enforcement circuitry 206 may apply an enforcement threshold of 80, which may specify, for instance, an enforcement probability of 80% for enforcing a first countermeasure that protects the protected circuitry 210. When the random number is equal to or below the enforcement threshold, for example, the enforcement circuitry 206 may enforce the first countermeasure for this particular access to the protected circuitry 210. When the random number exceeds the enforcement threshold, the enforcement circuitry 206 may forego enforcing the first countermeasure. During a subsequent access or execution of the protected circuitry 210, the enforcement circuitry 206 may generate another random number and perform a comparison to the enforcement threshold for determining whether to enforce the first countermeasure. Accordingly, enforcement of a first countermeasure that protects the protected circuitry 210 may vary randomly, and the enforcement circuitry 206 may non-deterministically enforce the first countermeasure.

The enforcement circuitry 206 may apply a common enforcement threshold to some or all of the countermeasures provided by the countermeasure circuitry 204 to protect the device logic 202. Optionally, the enforcement circuitry 206 may adjust the enforcement threshold for a particular countermeasure, e.g., by a predetermined weight according to a priority of the device logic 202 (or device logic portion) protected by the countermeasure check. To illustrate, the protected circuitry 210 of the device logic 202 may include a function characterized as low priority, such as presenting a user interface in a mobile device, and the protected circuitry 215 of the device logic 20 may include a function characterized as high priority, such as verifying a PIN to access user financial data. The enforcement circuitry 206 may adjust the enforcement threshold for enforcing a second countermeasure that protects the protected circuitry 215 to increase the density, rate, and/or probability at which this second countermeasure is enforced. Continuing an example presented above, the enforcement circuitry 206 may apply an enforcement threshold of 80 the first countermeasure that protects the protected circuitry 210 (e.g., lower priority) and increase the enforcement threshold of the second countermeasure that protects the protected circuitry 215 (e.g., higher priority) to 95, as one specific example.

In some implementations, the enforcement circuitry 206 may increase the enforcement threshold for a particular countermeasure such that the particular countermeasure is always enforced (e.g., an enforcement density or rate of 100% or greater). The enforcement circuitry 206 may do so for highly critical functions or portions of the device logic 202, and the enforcement parameters 128 may specify priority of different portions of the device logic 202. In other variations, the enforcement circuitry 206 may prevent a particular countermeasure from being enforced all the time, which may provide varying enforcement patterns by the device 100 or from device to device.

Aside from the random number generation and enforcement threshold examples provided above, the enforcement circuitry 206 may randomize enforcement countermeasures in additional or alternative ways, so that the device logic 202 is not always protected by countermeasures. As one example, the enforcement parameters 128 may specify a periodic enforcement schedule, which may vary between different countermeasures protecting the device logic 202. In this example, the enforcement circuitry 206 may periodically enforce a particular countermeasure according to an enforcement periodicity specified by the enforcement parameters 128, which may be expressed, for example, in periods of time or periods of executions or accesses of device logic 202 protected by the particular countermeasure. The device 100 may vary the enforcement periodicity of a particular countermeasure as another way to randomize enforcement of the particular countermeasure, e.g., in response to an enforcement transition indication such as upon powering down or powering up the device 100 or in response to a user input.

As another variation, the enforcement circuitry 206 may apply any number of randomization techniques when non-deterministically enforcing a countermeasure check. The enforcement circuitry 206 may access random or predetermined data (e.g., a program counter, a random register, or a current time value), and enforce a countermeasure based on a particular value or set of values in the selected data. As particular examples, the enforcement circuitry 206 may perform an exclusive or (XOR) operation on a binary representation of the selected data, and selectively enforce the countermeasure based on the output of the XOR operation. Additional examples include selectively enforcing a countermeasure according to a value of least significant bit of the selected data, upon a modulus operation performed on the selected data, or according to the output of a randomizing function.

Figure 3:
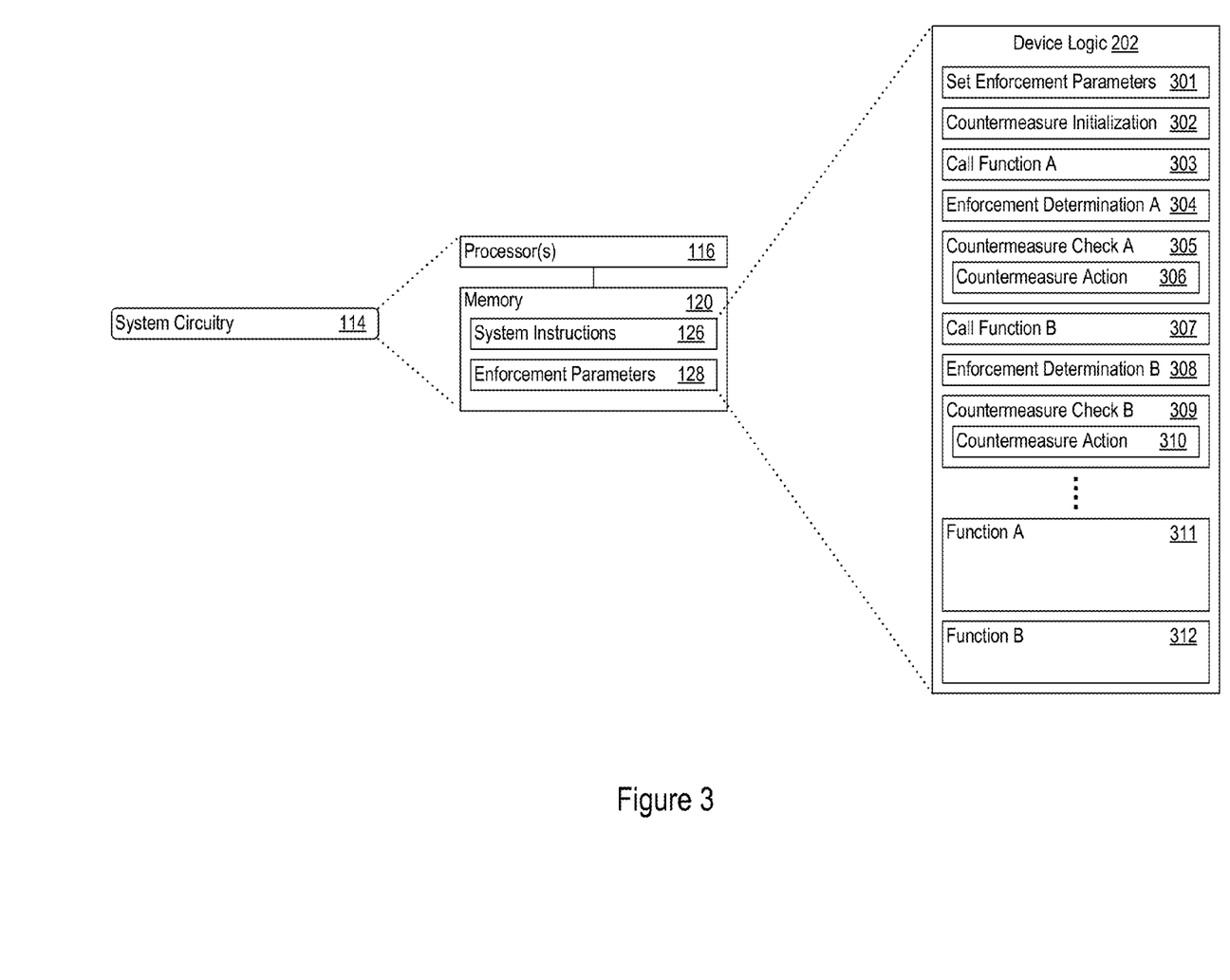
FIG. 3 shows another exemplary implementation of system circuitry for non-deterministic enforcing countermeasures for fault attacks.

FIG. 3 shows another exemplary implementation of system circuitry 114 that non-deterministically enforces countermeasures for fault attacks. In the exemplary implementation shown in FIG. 3, the system instructions 126 and/or enforcement parameters 128 may implement the device logic 202, e.g., in software. In a software implementation, the device logic 202 itself may include instructions that perform fault attack countermeasures (e.g., a countermeasure check and action), instructions that non-deterministically enforce the countermeasures, or both.

Turning to the exemplary device logic 202 of FIG. 3 in detail, the device logic 202 includes the instructions labeled as 301-312. The instructions 301-312 may respectively include one or more processor executable instructions for performing a particular function, some of which are described next. The set enforcement parameter instructions 301 may set one or more parameter values for non-deterministically enforcing countermeasure checks in the device logic 202, e.g., by setting a enforcement threshold parameter value. The countermeasure initialization instructions 302 may initiate or set any variables, memory elements, or other configurations associated with protecting the device logic through countermeasures, e.g., by setting an checkvalue variable to an initial predetermined value. The device logic 202 may also include instructions for calling a particular function as well as the instructions that implement the particular function, e.g., the call function instructions 303 and 307 as well as the function instructions 311 and 312 for functions A and B respectively.

The exemplary device logic 202 in FIG. 3 includes fault attack countermeasures as well as instructions for non-deterministically enforcing a countermeasure. In particular, the device logic 202 may cause execution of the enforcement determination A instructions 304 after calling and executing function A. The enforcement instructions 304 may, in some variations, non-deterministically enforce (e.g., execute) the countermeasure check A instructions 305 at an enforcement density specified by the enforcement parameters. When the countermeasure check A instructions 305 are enforced, the device logic 202 may determine whether a fault injection occurred while executing function A, and if so, respond by executing the countermeasure action 306. The device logic 202 may similarly execute the enforcement determination B instructions 308 to non-deterministically enforce the countermeasure check B instructions 309 and countermeasure action instructions 310.

One example software implementation of the device logic 202 is presented in the following pseudocode:

```
1:#define THRESHOLD_BASE 80 //Set Enforcement Parameter
2:checkvalue = 0x3A; // checkvalue being initialized before call
3:function_A( );
4:rand_num = generate_random(1,100); //generate a random number between 1 and 100
5:if(rand_num < THRESHOLD_BASE)// Enforce the check only if below threshold
6:   if (checkvalue != 0x6D) goto FaultDetected;
7:function_B( );
8:rand_num = generate_random(1,100 );//generate a random number between 1 and 100
9: if(rand_num < THRESHOLD_BASE + 15)// Enforce the check only if below threshold, increased threshold for function B
10:   if (checkvalue != (n+0x58)) goto FaultDetected;
...
void function_A( )
{
    checkvalue += 0x05; // checkpoint to be passed after entering function
    ... // some non-security-relevant processing
    checkvalue += 0x0B; // checkpoint to be passed
    ... // some non-security-relevant processing
    checkvalue += 0x23; // checkpoint to be passed before returning to caller
    return;
}
void function_B( )
{
    checkvalue += 0x09; // checkpoint to be passed after entering function
    ... // some security-relevant processing
    checkvalue += 0x0D; // checkpoint to be passed
    ... // some security-relevant processing
    checkvalue += 0x42; // checkpoint to be passed before returning to caller
    return;
}
```

In the exemplary pseudocode implementation above, lines 4 and 5 may correspond to an enforcement determination instruction that causes non-deterministic enforcement of the countermeasure instruction (check and action) of line 6 for function_A. Similarly, lines 8 and 9 may correspond to an enforcement determination instruction that causes non-deterministic enforcement of the countermeasure instruction (check and action) of line 10 for function_B.

Figure 4:
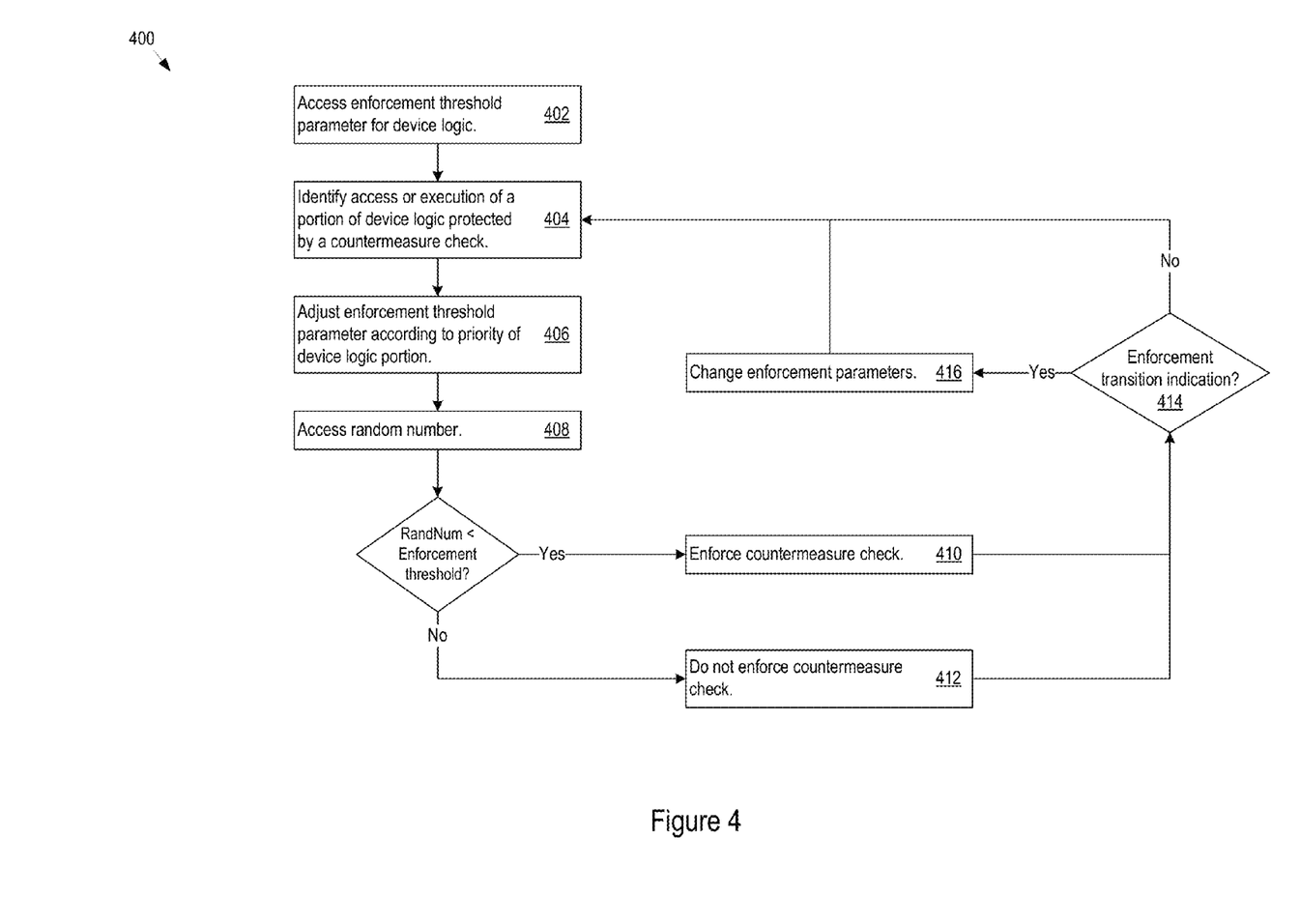
FIG. 4 shows an example of logic for non-deterministically enforcing countermeasures that the device may implement.

FIG. 4 shows an example of logic 400 for non-deterministically enforcing countermeasures. The device 100 may implement the logic 400 in hardware, software, or both. For example, the device 100 may implement the logic 400 as the system circuitry 114 in any combination of the countermeasure circuitry 204, enforcement circuitry 206, and device logic 202.

The system circuitry 114 may access one or more of enforcement parameters 128, such as an enforcement threshold parameter specified for device logic 202 (402). The enforcement threshold parameter may indicate a countermeasure enforcement density for the device logic 202. To access the enforcement parameters 128, the system circuitry 114 may read parameter values from a memory 122, receive a user input specifying an enforcement parameter, or execute an instruction in the device logic 202 that sets an enforcement parameter value. The device logic 202 may be protected by one or more countermeasures, which may include a countermeasure check and countermeasure action. The system circuitry 114 may identify a countermeasure trigger for a particular countermeasure check. In response, the system circuitry 114 may non-deterministically enforce the particular countermeasure check. As examples, the system circuitry 114 may identify the countermeasure trigger as an access or execution of the portion of the device logic 202 protected by the particular countermeasure check (404).

The system circuitry 114 may adjust an enforcement threshold parameter for the device logic portion according to a priority of the device logic portion (406). For high priority portions of the device logic 202 (e.g., as specified by the enforcement parameters 128), the system circuitry 114 may adjust the enforcement threshold parameter to increase the countermeasure enforcement density for the high priority portion of the device logic 202 and which may result in a greater probability or likelihood that the system circuitry 114 determines to enforce the corresponding countermeasure that protects the high priority portion. The system circuitry 114 may identify high priority portions of the device logic 202 as, for example, critical code functions, memory elements storing sensitive data (e.g., financial data or password data), or circuitry that performs security verifications. For low priority portions of the device logic 202, the system circuitry 114 may adjust the enforcement threshold parameter to decrease the countermeasure enforcement density.

The system circuitry 114 may non-deterministically enforce a countermeasure checks that protects the device logic 202 so the device logic 202 is not always protected by a countermeasure action within the countermeasure check. The system circuitry 114 may enforce countermeasure checks that protect the device logic 202 at a rate dependent upon or specified by the enforcement threshold parameter. As one exemplary implementation of non-deterministic enforcement, the system circuitry 114 may access a random number within a predetermined number range (408). In some variations, the system circuitry 114 generates a random number specific to this particular enforcement determination for a particular countermeasure check. In other variations, the system circuitry 114 accesses a previously generated random number that the system circuitry 114 may apply to multiple countermeasure enforcement determinations.

The range over which the system circuitry 114 generates a random number may correlate with the enforcement threshold parameter. For instance, when the enforcement threshold parameter specifies an enforcement percentage (e.g., a number between 0-100), the system circuitry 114 may determine a random number within the same range of values of the enforcement threshold (e.g., 0-100). As another example, the enforcement threshold parameter may specify a particular number of countermeasures to enforce within the device logic 202, which may range from 0 to the total number of countermeasures that protect the device logic 202. As such, the system circuitry 114 may generate a random number within a numerical range of 0 to the total number of countermeasures that protect the device logic 202.

The system circuitry 114 may compare the generated random number to the enforcement threshold parameter. When the random number does not exceed the enforcement threshold, the system circuitry 114 may enforce the countermeasure check (410), which may also include enforcing a countermeasure action upon detection of a fault injection. When the random number exceeds the enforcement threshold, the system circuitry 114 may determine not to enforce the countermeasure check (412).

As a variation, the system circuitry 114 may non-deterministically enforce a countermeasure action within the countermeasure check. In this variation, the system circuitry 114 may (e.g., always) perform a countermeasure check as to whether a fault attack occurred when executing or accessing device logic 202, but non-deterministically enforce a countermeasure action in response to the check, such as through any of the non-deterministic enforcement techniques discussed above. In this implementation, the system circuitry 114 may track a number of fault injections that occurred/were detected and for which the system circuitry 114 determined not to take a responsive countermeasure action, which may provide greater insight into fault attack strategies and occurrence rate.

The system circuitry 114 may vary any number of enforcement parameters, configurations, or processes to further randomize enforcement of countermeasure protecting the device logic 202. Doing so may further increase security of the device logic 202. In some implementations, the system circuitry 114 may identify an enforcement transition indication (414), and in response, vary one or more enforcement parameters 128 or other enforcement configurations (416). The system circuitry 114 may identify an enforcement transition indication in response to occurrence of an event, such as a system reboot of the device 100, the device 100 entering a new power cycle, in response to a wake-up procedure performed by the device 100, according to a user request, at a randomly determined time, when a particular program counter value is reached, when exceeding a particular operating voltage or temperature, according to a processor performance or usage threshold, or after breaking a predetermined power or energy threshold for the device 100. As other variations, the system circuitry 114 may periodically or randomly vary the enforcement parameters 128, such as after a specified period of time or after a predetermined number of executions of the device logic 202, as examples.

In changing the enforcement parameters, the system circuitry 114 may vary the enforcement threshold parameter. Thus, the system circuitry 114 may vary the enforcement density of countermeasure protecting the device logic 202 even within a single device. As another option, the system circuitry 114 may vary the method or technique used by the system circuitry 114 to non-deterministically enforce countermeasures, e.g., from enforcement determined based on random number generation to an XOR-based determination (e.g., output of an XOR operation on a selected binary data). As yet another option, the system circuitry 114 may generate a new random number used during enforcement determinations. By varying any number of configurations, randomization techniques, and/or parameter values, the system circuitry 114 may provide increased security for the device logic 202 through increased randomization of countermeasure protection.

Figure 5:
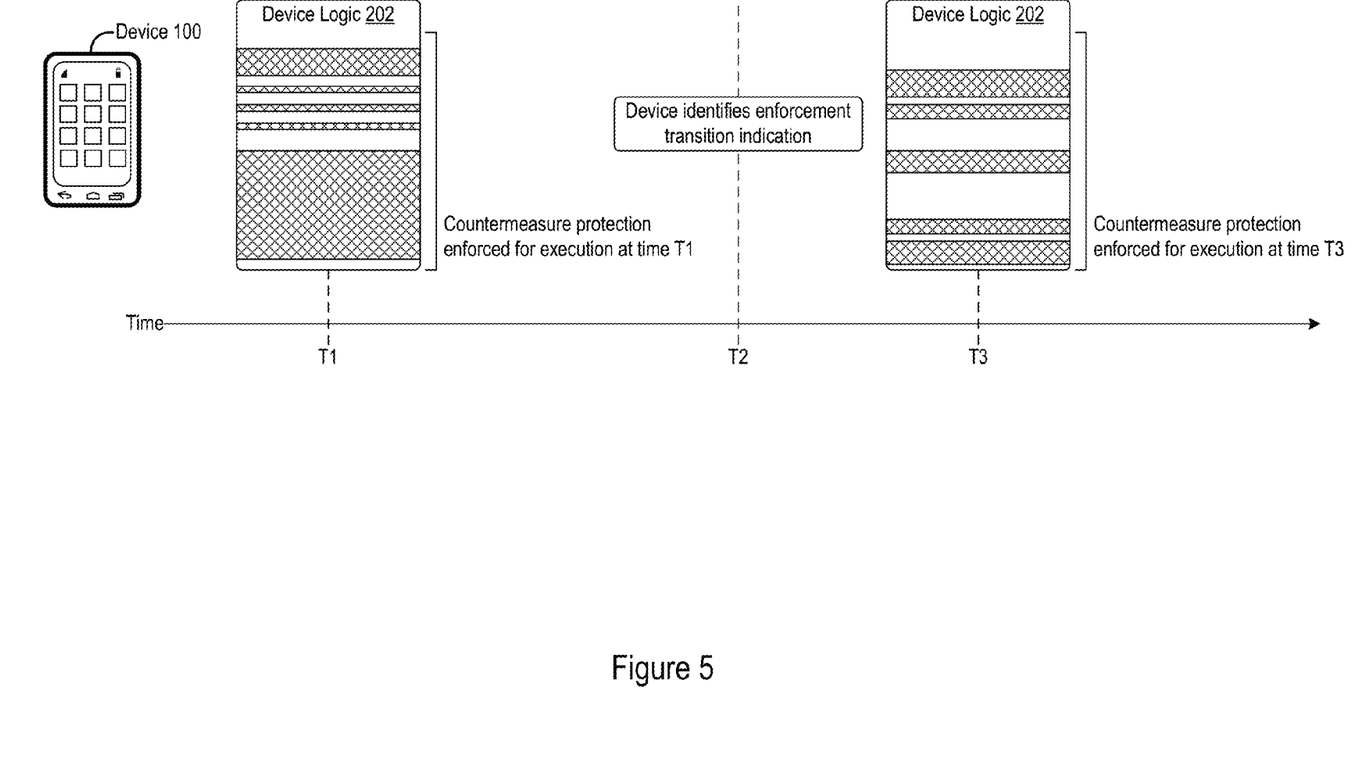
FIG. 5 shows an example of countermeasures a device may enforce at different times.

FIG. 5 shows an example of countermeasures a device 100 may enforce at different times. In the example shown in FIG. 5, the device logic 202 may be a section of application code executed by the device 100, for example a mobile banking application. The banking application implemented by the device logic 202 may be protected by multiple fault attack countermeasures. FIG. 5 illustrates the countermeasure protection enforced by the device 100 at times T1 and T3. During time T1, the device 100 may execute the device logic 202 and non-deterministically enforce the countermeasures that protect the device logic 202. As such, FIG. 5 illustrates a shaded portion of the device logic 202 at time T1 indicating the portions of the device logic 202 for which the device 100 determines to enforce countermeasure checks. The non-shaded portions of the device logic 202 at time T1 indicate the portions of the device logic 202 for which the device 100 determined not to enforce the countermeasure checks protecting the device logic 202.

At a second time T2, the device 100 may identify an enforcement transition indication, and vary one or more enforcement parameter values or other enforcement configurations. For example, the device 100 may lower the enforcement density of the countermeasures protecting the device logic 202 at time T2 and in response to the enforcement transition indication. At time T3, the device 100 may execute the device logic 202 another time, and non-deterministically enforce the countermeasures that protect the device logic 202. The shaded portions of the device logic 202 at time T3 may indicate the countermeasure protection enforced by the device 100 at time T3. Accordingly, at time T3, the device 100 may enforce different countermeasures that protect different portions of the device logic 202 than the countermeasure enforcement at time T1, e.g., with a lower enforcement density that may result in a less portion of the device logic 202 for which countermeasure checks were enforced.

The device 100 may also vary enforcement of countermeasures for different executions of the device logic 202 without identifying an enforcement transition indication. For example, the device 100 may execute the device logic 202 a first time and a second time without changing enforcement parameters or configurations, e.g., without changing the enforcement density for countermeasures protecting the device logic 202. The device 100 may non-deterministically enforce countermeasure checks protecting the device logic 202, with varying results between executions. To illustrate, during a first execution, the device 100 may generate a random number resulting in enforcement of a particular countermeasure check protecting the device logic 202. During the second execution, the device may generate another random number resulting in non-enforcement of the same particular countermeasure. Thus, the device 100 may enforce different sets of countermeasures during different executions of device logic 202. Put another way, the device 100 may enforce a first subset of the countermeasures protecting device logic 202 during a first execution and enforce a second, different subset of the countermeasures during a second execution of the same device logic 202, even without any change in enforcement parameters.

Accordingly, the device 100 may vary countermeasure protection for the device logic 202 at different times and at different executions and accesses of the device logic 202. This randomization and variation in enforcement may result in strengthened protection against fault attacks as an attacker may be unable to ascertain the fault protection patterns that protect the device logic 202. This protection and randomization may also extend across multiple devices as well.

Figure 6:
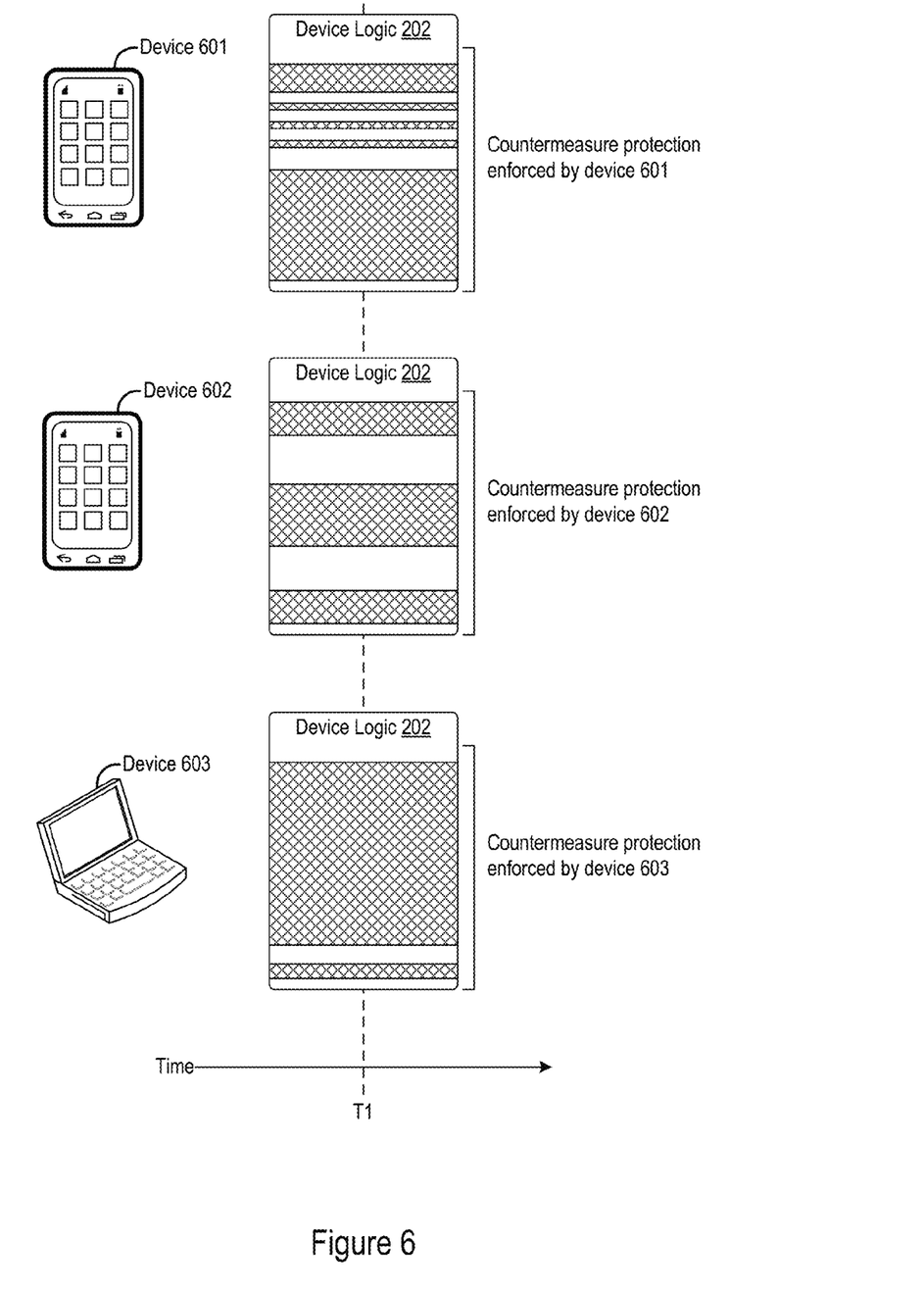
FIG. 6 shows an example of multiple devices that non-deterministically enforce countermeasures for fault attacks.

FIG. 6 shows an example of multiple devices 601-603 that non-deterministically enforce countermeasures for fault attacks. In FIG. 6, device 601 may be a mobile phone and device 602 may also be a mobile phone. Devices 601 and 602 may different devices of the same phone model, or share any number of common characteristics. Device 603 may be a laptop computer. In FIG. 6, the device logic 202 may be a software application, and the devices 601-603 may execute identical or consistent copies of the device logic 202 at a time T1. Even though the devices 601-603 execute the same device logic 202, the enforcement of fault attack countermeasures by the devices 601-603 may vary, as indicated through the shade portions of the device logic 202 for the devices 601-603 respectively. The devices 601-603 may vary countermeasure protection based on differing enforcement density thresholds or through randomization of which particular countermeasures are enforced by the devices 601-603, which may result in unique countermeasure enforcement patterns that vary across multiple devices.

As discussed above, the system circuitry 114 may randomize enforcement of countermeasure checks and actions that protect device logic 202, whether within a single device (e.g., across different boot cycles and different executes) or across multiple devices. Such randomization may provide a unique countermeasure enforcement pattern that prevents an attacker from identifying specific (e.g., critical) portions of the device logic 202. The randomization of countermeasure enforcement may also increase the difficulty of which an attacker can successfully replicate an attack on the device logic 202. Additionally, the countermeasure enforcement randomization discussed above may result in improvements in device performance and energy consumption, as system circuitry 114 may enforce a lesser number of countermeasure checks and/or actions.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
    countermeasure circuitry configured to:
        responsive to an enforcement decision, execute a countermeasure action chosen from among a pre-defined set of countermeasure actions that protect device logic; and
        responsive to a non-enforcement decision, forgo execution of the countermeasure action; and
    enforcement circuitry configured to arrive at, via a randomized enforcement pattern, enforcement decisions and non-enforcement decisions applicable to the countermeasure actions within the pre-defined set of countermeasure actions on the device logic.

2. The device of claim 1, where the enforcement circuitry is configured to arrive at, via the randomized enforcement pattern, the enforcement decisions and non-enforcement decisions by:
    assigning an enforcement threshold for a countermeasure check associated to the countermeasure action;
    generating a random number; and
    determining to enforce the countermeasure check responsive to an output of a function of the random number and the enforcement threshold.

3. The device of claim 2, where the enforcement circuitry is further configured to arrive at, via the randomized enforcement pattern, the enforcement decisions and non-enforcement decisions by:
    adjusting the enforcement threshold by a predetermined weight according to a priority of the device logic protected by the countermeasure check.

4. The device of claim 2, where the enforcement circuitry is further configured to arrive at, via the randomized enforcement pattern, the enforcement decisions and non-enforcement decisions by:
    identifying an enforcement transition indication; and
    assigning a new enforcement threshold for the countermeasure check.

5. The device of claim 2, where the enforcement threshold is set according to a specified enforcement rate for enforcing countermeasures that protect the device logic.

6. The device of claim 5, where the enforcement rate specifies a percentage of countermeasures protecting the device logic to enforce.

7. A system comprising:
    device logic protected by countermeasure checks; and
    countermeasure enforcement circuitry configured to:
        according to a randomized enforcement pattern, select non-enforcement for a first subset of the countermeasure checks during execution of the device logic; and
        according to the randomized enforcement pattern, select enforcement for a second subset of the countermeasure checks during execution of the device logic, where the first subset and the second subset non-deterministically change over time relative to prior selections of enforcement and non-enforcement of the countermeasure checks made during prior execution of the device logic.

8. The system of claim 7, where the system further comprises
    an enforcement threshold parameter indicative of an enforcement rate for the countermeasure checks; and
    where the countermeasure enforcement circuitry is configured to selectively enforce the countermeasure checks that protect the device logic at the enforcement rate specified by the enforcement threshold parameter.

9. The system of claim 8, where the countermeasure enforcement circuitry is further configured to:
    adjust the enforcement threshold parameter applied to a particular countermeasure check by a predetermined weight according to a priority of a device logic portion protected by the particular countermeasure check.

10. The system of claim 8, where the countermeasure enforcement circuitry is further configured to:
    identify an enforcement transition indication; and
    responsive to the enforcement transition indication, assign a new value to the enforcement threshold parameter.

11. The system of claim 10, where the enforcement transition indication comprises the system entering a new power cycle, a new boot cycle, or both.

12. The system of claim 8, where the countermeasure enforcement circuitry is further configured to periodically change a value of the enforcement threshold parameter.

13. A method comprising:
    in a device:
        implementing a pre-defined set of countermeasure checks that protect device logic against one or more fault attacks;
        implementing a pre-defined set of corresponding countermeasure actions enforced by the pre-defined set of countermeasure checks; and
        when an access of the device logic that is protect by at least an individual countermeasure check of the pre-defined set of countermeasure checks occurs, selecting, in accord with a randomized enforcement pattern, enforcement or non-enforcement for a corresponding countermeasure action for the individual countermeasure check.

14. The method of claim 13, where selecting enforcement or non-enforcement in accord with the randomized enforcement pattern comprises:
    assigning an enforcement threshold for the countermeasure check;
    generating a random number; and
    determining to enforce the countermeasure check when the random number exceeds the enforcement threshold.

15. The method of claim 14, where the enforcement threshold is indicative of an enforcement rate for enforcing countermeasures that protect the device logic.

16. The method of claim 15, where the enforcement rate specifies a percentage of countermeasures protecting the device logic to enforce.

17. The method of claim 14, where selecting enforcement or non-enforcement in accord with the randomized enforcement pattern further comprises adjusting the enforcement threshold by a predetermined weight according to a priority of the device logic protected by the countermeasure check.

18. The method of claim 14, where selecting enforcement or non-enforcement in accord with the randomized enforcement pattern comprises:
- identifying an enforcement transition indication; and
- assigning a new enforcement threshold for the countermeasure check in response.

19. The method of claim 18, where the enforcement transition indication comprises the device entering a new power cycle, a new boot cycle, or both.

20. The method of claim 14, where selecting enforcement or non-enforcement in accord with the randomized enforcement pattern comprises periodically changing a value of the enforcement threshold.

\* \* \* \* \*